United States Patent [19]

Hanisch et al.

[11] Patent Number: 5,079,286

[45] Date of Patent: Jan. 7, 1992

[54] CASTING RESINS BASED ON ACRYLIC ACID ESTERS

[75] Inventors: Horst Hanisch, Hennef/Sieg; Theo Lenz, Siegburg; Guenther Bernhardt, Augustin, all of Fed. Rep. of Germany

[73] Assignee: Huels Troisdorf AG, Cologne, Fed. Rep. of Germany

[21] Appl. No.: 178,052

[22] Filed: Apr. 5, 1988

Related U.S. Application Data

[63] Continuation-in-part of Ser. No. 818,984, Jan. 6, 1986, abandoned, which is a continuation of Ser. No. 538,588, Oct. 3, 1983, abandoned.

[30] Foreign Application Priority Data

Oct. 5, 1982 [DE] Fed. Rep. of Germany ....... 3236814
Aug. 31, 1983 [DE] Fed. Rep. of Germany ....... 3331371

[51] Int. Cl.$^5$ ................................. C08K 5/05
[52] U.S. Cl. .................... 524/382; 524/264; 524/265; 524/266; 524/730; 524/858; 525/100; 525/101
[58] Field of Search ............... 524/264, 265, 266, 382, 524/858, 730; 525/100, 101

[56] References Cited

U.S. PATENT DOCUMENTS 4,221,697 9/1980 Osborn et al. ...................... 524/853
4,251,576 2/1981 Osborn et al. .................. 524/787 X Primary Examiner—Joseph L. Schofer
Assistant Examiner—J. M. Reddick
Attorney, Agent, or Firm—Felfe & Lynch

[57] ABSTRACT

Disclosed is a casting resin based on acrylic acid esters having a high content of finely dispersed fillers and containing a mixture of organosilicon compounds having functional groups and metallic acid esters of metals of Groups IVB and VB of the Periodic Table of the Elements. The functional group of the organosilicon compound is ethylenically unsaturated and bound to the silicon atom either directly or through alkylene groups. The addition of this mixture to the casing resins produces a desirable reduction of the viscosity of these resins, which are used, for example, for the manufacture of sanitary articles.

The filler content is at least 20% and can be as high as 95% with the proviso that when the filler content is in excess of 80 wt. -%, the filler contains 10 to 30 wt. -%, based on the total weight of filler, of fines having a particle size less than 0.1 mm and the remainder of the filler being coarse up to 4 mm.

17 Claims, No Drawings

CASTING RESINS BASED ON ACRYLIC ACID ESTERS

This is a continuation-in-part of Ser. No. 818,984 filed Jan. 6, 1986 now abandoned which is a continuation of Ser. No. 538,588, filed Oct. 3, 1983 now abandoned.

BACKGROUND OF THE INVENTION

The present invention is in a casting resin or a hardenable composition based on hardenable acrylic and methacrylic acid esters and finely divided inorganic fillers which contain a mixture of metallic acid esters and organic silicon compounds as adhesivizing agents. The casting resin is flowable at its pouring temperature.

It is known to mix inorganic fillers with casting resins based on hardenable acrylic and methacrylic acid esters, referred to also herein as unsaturated casting resins. Casting resins are also known which contain the inorganic fillers in percentages exceeding 50%, and in which these fillers are required to be particularly finely divided. In these last-named casting resins, the use of organic silanes as adhesivizers has also been described (cf. DE-OS 2 449 656, U.S. Pat. Nos. 4,221,697 and 4,251,576). These known casting resins containing finely divided fillers have higher densities than unfilled, unsaturated casting resins, and greater hardness and improved stiffness. Also, the inorganic fillers diminish the shrinkage of the resins as well as their temperature rise during hardening.

The high content of finely divided fillers which is finely distributed in the casting resins when organosilanes are used as adhesivizing or bonding agents, increases the bending strength and impact toughness of the moldings made from these resins. Moldings which are manufactured from these known, unsaturated casting resins include sanitary products, such as for example sinks or washbasins.

In the manufacture of these moldings, the unsaturated casting resin is to have a very low viscosity so that, when it is poured into the molds it will fill them out completely and to the correct degree. This requirement is not met by many unsaturated casting resins on account of their high content of fillers. Neither can this problem be solved by the addition of organosilicon compounds. Certain organosilicon compounds actually produce a further increase in viscosity.

The problem therefore existed of improving the known unsaturated casting resins based on acrylic acid esters and finely divided inorganic fillers and containing organosilicon compounds as adhesivizers such that they will have the viscosity that is necessary for their use, but one much lower than that of the unmodified casting resins. The new casting resins, however, are also to have the same good physical characteristics as the known unsaturated casting resins.

DESCRIPTION OF THE INVENTION

As a solution to this problem, a casting resin based on acrylic and methacrylic acid esters and finely divided inorganic fillers and containing organosilicon compounds as adhesivizers has been found. The casting resin of the invention contains an organosilicon compound having one or more ethylenically unsaturated groups and a metallic acid ester or an organic complex salt of metals of Groups IVB or VB of the Periodic Table of the Elements.

The unsaturated casting resin of the invention in the unhardened state surprisingly has a viscosity which is considerably lower than the viscosities of the analogous casting resins without the addition of the claimed components. If, however, only one of the components is contained in the casting resin in the same quantity ratio as in the claimed mixture, the resulting resins do not exhibit the same low viscosity numbers obtainable with a mixture in accordance with the invention. Thus, an unexpected improved result is to be seen between these two claimed groups of compounds. The combination of unsaturated organosilane and metal ester has an unexpected effect in decreasing the viscosity of the casting resins. Each substance, used by itself, does not have a viscosity-lowering effect.

The amount of organosilicon compound and metallic acid ester used in the invention is very small. Practically speaking, it is related to the filler content contained in the casting resin, and the amount of the latter is widely variable. The organosilicon compound is generally used in amounts between 0.025 and 4 wt.-%, and the metallic acid ester in amounts between 0.009 and 1 wt.-%. The content of the individual compounds and compound groups in the casting resin can also be higher, but in that case it does not result in a substantial improvement of the desired effect.

The ratio of metallic acid ester to organosilicon compound can be varied within a broad range. It can be between 1:10 and 10:2. The preferred range is between 4:10 and 10:4. A highly preferred range for the ratio of metal acid ester to organosilicon compound is 1:3.

Functional organosilicon compounds having an ethylenically unsaturated group, which are referred to herein also as unsaturated organosilanes, are those di- and trialkoxysilanes whose organofunctional moiety contains a carbon-to-carbon double bond. This moiety is always bound by a carbon atom to the silicon atom, and this carbon atom can be linked to the adjacent carbon atom by a double bond, as in the case, for example, of the vinyltrialkoxysilanes. The C=C double bond, however, can also be separated from the silicon atom by one or more carbon atoms, as in the case, for example, of the allyl-trialkoxysilanes or the gamma-methacryloxypropyltrialkoxysilanes. The corresponding dialkoxysilanes can also be used, in which case either an alkyl moiety having preferably 1 to 4 carbon atoms, or a second organofunctional moiety having a C=C double bond (which generally is the same moiety as the first organofunctional moiety), is bound to the silicon atom. The alkoxy group of the unsaturated organosilane has preferably 4 carbon atoms. If desired, the carbon chain can be interrupted by an ether oxygen atom.

The preferred monomeric silanes are essentially the γ-methacryloxypropyltrialkoxysilane and the corresponding acryl silane and its analogous silanes with only two alkoxy groups and one alkyl group at the silicon atom, as well as the corresponding vinyl silanes. The monomeric compounds may be characterized by the following Formula I:

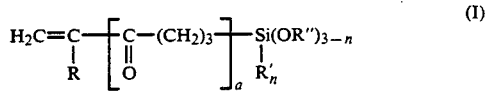
(I)

where R is hydrogen in all cases if a=0 and 1 or —CH₃ if a=1; R¹ is methyl or vinyl under the condition that a=0 or alkyl with 1 to 4 carbon atoms under the condition that a=1; $R^{11}$ is alkyl with 1 to 4 atoms; n stands for 0 or 1 or 2.

Examples of such unsaturated organosilanes are: vinyltrimethoxysilane, vinyltriethoxysilane, vinyl-tris(-methoxy-ethoxy)-silane, divinyldimethoxysilane, vinyl-methyl-dimethoxysilane, gamma-methacryloxypropyl-trimethoxysilane, or gamma-methacryloxypropyltris(-methoxyethoxy)silane.

Organosilicon compounds having several unsaturated groups, which are referred to herein as unsaturated polymeric organosilanes, are, in accordance with the invention, copolymers of a plurality of ethylenically unsaturated compounds. They contain at least two different basic building blocks, each having two chain carbon atoms, one of the basic building blocks being linked to an alkoxysilyl grouping which is joined to the basic building block either directly or through a

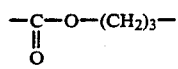

group, and the other basic building block containing an alpha halogen carboxylic acid moiety whose halogen atom is substituted by an acrylic or methacrylic acid moiety. In addition the copolymer can also contain basic building blocks which have ethylenically unsaturated groups having no functional groups. The preparation of these compounds is described in DE-OS (Patent Application) P 3 227 552 and U.S. Pat. No. 4,625,006 which are especially cited here.

The polymeric organosilanes differ from the monomeric compounds in that the former additionally include a polymeric biradical group with chain carbon atoms of at least two ethylenically unsaturated compounds between the unsaturated acrylic acid group and the group in the square brackets of Formula I. These chain carbon atoms originate, on the one hand, from the vinyl chloroacetate substituted by (methy)acryloxy groups and, on the other, from the ethylenically unsaturated group from the above-mentioned vinylsilanes or acrylate silanes the chain includes further —CH$_2$—CH$_2$—groups, deriving from vinyl compounds (now functional) or other ethylenically unsaturated nonfunctional compounds linked with the above mentioned chain atoms of —A"—. These polymeric silanes may be characterized by the following Formula II, in which A is the described polymeric entity:

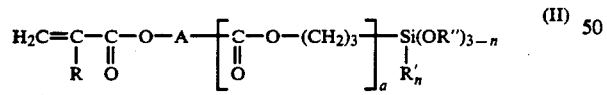

where R is hydrogen or —CH$_3$ R' and R" is alkyl with 1 to 4 carbon atoms. a=0 or 1 and n=0 or 1 or 1.

It is highly preferred that the substituted vinyl V chloroacetate group alternates with the vinylsilane or methacrylate silane group. These two groups may, however,—and this is generally the case—also succeed one another irregularly in a random distribution.

Esters, useable in the invention include those compounds, the ester group of which is derived from an alcohol as well as from an acid. The useable metallic esters include the esters of the metallic acids of compounds of Group IVB or VB of the Periodic Table of the Elements, mainly titanium, zirconium and vanadium acid esters. The ester component can contain 1 to 18 carbon atoms and can be derived either from phenols, which may be alkyl-substituted if desired, or from aliphatic alcohols. The ester component may also be a mixed ester.

Those compounds which can be used according to the invention include, among others, methyl titanate, ethyl titanate, butyl titanate, butyl polytitanate, nonyl titanate, cetyl titanate, tributyloleyl titanate, cresyl titanate, cresyl polytitanate, propyl zirconate, butyl zirconate, ethyl vanadate and butyl vanadate.

It can be seen from this list that the corresponding polymeric esters can be used if they are stable. Mixed esters in which one or more alkoxy groups is replaced by a complexing agent, such as acetyl acetone or acetoacetic acid ester, as for example in the case of diisopropoxy-bis(2,4-pentanedionato)-titantium(IV), which is also known by the name of titanium acetyl acetonate are also useful in the invention. Other metallic acid complex compounds which do not contain ester groupings can be used, such as, for example, tris-(2,4-pentanedionato)-vanadium(III) or oxy-bis(2,4-pentanedionato)-vanadium(IV).

Metallic acid esters of little inherent coloration are preferred.

The resin component of the unsaturated casting resin of the invention is a hardenable acrylic resin. The term "acrylic resin", as used herein, refers to liquid polymers of the acrylic acid ester methyl-substituted or ethylsubstituted if desired, in the alpha position. The ester component can be derived from aliphatic or aromatic alcohols having 1 to 18 carbon atoms and can be interrupted, if desired, by an ether oxygen atom. These liquid polymers can contain, if desired, an additional solid, no longer cross-linking polymer from the same group, in dissolved or dispersed form. Methylmethacrylate is the preferred ester for medium-reactive resins which do not crosslink during hardening. Highly reactive resins which crosslink during hardening contain crosslinking components, such as ethylene glycol dimethacrylate and methacrylates of butenediol or allyl alcohol. Such resins or resin mixtures, which can be used as components for casting compositions, are known (cf. DE-OS 2 449 656).

The hardening of these resins or resin mixtures is also performed in a known manner, e.g., by the addition of inorganic peroxides and, if desired, activators or accelerators, depending on whether the hardening is performed at room temperature or at an elevated temperature.

The casting resin furthermore contains one or more fillers. In one embodiment of the invention, the filler is in a finely divided particle form. The particle size is no larger than 100 microns. The preferred size ranges are from 0 to 10, 0 to 40 and 0 to 60 microns. An especially good effect is obtained by the mixture of the invention combined with fillers in the particle size range between 0 and 10 microns. In this embodiment the casting resin of the invention contains at least 20% but no more than 80% by weight and preferably the percentage of the filler in the finished casting resin is between 50 and 70% by weight.

In another embodiment of the invention, the filler content may be as high as 95 wt.-%. At the higher filler however, has a particle size, which is larger than 100 μm. The proportion of fillers of larger particle size is at least 15%. However, it may be higher depending on the desired product.

If the filler constitutes more than 80% of the mixture of resin and filler, it should contain 10 to 30% by weight, based on the total amounts of filler, of fines having a particle size less than 0.1 mm. The proportion of coarser particles should accordingly lie between 70 and 90% by weight. The particle size of the coarse portion may be as large as 4.0 mm.

The filler can be of natural or synthetic origin; and should have a hardness suitable for the purpose for which it is to be used. Fillers of natural origin are, for example, minerals such as aluminum oxides, double oxides of aluminum with alkali and/or alkaline earth metals, silicon dioxide in its various modifications, silicates, aluminosilicates, calcite and other carbonates, carbides, oxides and sulfides. These substances can also be modified by subsequent working processes. Examples of such fillers include: quartz flour, kaolin, talcum, mica, argillaceous earth, zinc white, chalk, limestone, dolomite, gypsum and blanc fixe. Examples of synthetically made fillers include glass flour, slag ash, and finely divided silica.

It is not necessary to use a dispersant, such as those positively prescribed in DE-OS 2 449 656, in the invention because of the presence of the mixture of the invention, consisting of an unsaturated organosilicon compound and metallic acid ester. The fillers are uniformly distributed in the unsaturated, liquid casting resin, free of aggregation, if this resin has otherwise been made by known methods.

Like the known filler-containing casting resins, the casting resin of the invention can contain, in addition to the filler, fibrous strengthening substances, which need not satisfy the fineness of grain requirement. These fibrous substances include, for example, glass fibers, mineral fibers or asbestos. The content of these strengthening substances should not be greater than the content of the finely granular fillers.

The casting resins of the invention can include colorizing additives such as pigments and/or dyes. Products which are resistant to yellowing, coking and cracking are preferred as such additives and include: iron oxides, titanium dioxide, blanc fixe, zinc white, ultramarine blue, and carbon black.

The preparation of the liquid, hardenable casting resins of the invention is performed in a manner known in itself, as described, for example, in DE-OS 2 449 656. In general, first the additives of the invention are mixed with the liquid, unsaturated resin, and then the filler or fillers and the strengthening substances, if any, are dispersed in the mixture thus obtained. The resin can already contain the hardening catalyst, especially if the casting resin is to be heat hardened. It is desirable, however, not to add the hardening catalyst, and the accelerators if any, until just before the hardening step, and then to produce the desired casting.

Casting resins containing more than 80% fillers are prepared basically as described above. In general, a binder resin is prepared first, which contains the fine portion of the fillers in the total resin. These fine portions may constitute up to 80% of the total filler portion. The particle size of this fine portion ranges up to 100 μm. The coarse portion of the filler, with particle sizes up to 4.0 mm, is mixed with this resin mixture with the well dispersed fine portion.

The addition of the inventive mixture of organosilanes and metal acid ester reduces the viscosity of the casting resins by about 50 to 75%. The amount of organosilane and metal acid ester added is the same for highly filled resins as for those that are not so highly filled (and contain) up to 80% filler.

Sanitary products, for example, such as washbasins, drinking cups, sinks or toilet bowls, or castings for the building industry, such as machine bases, machine beds, or tanks can be made from the composition in accordance with the invention.

EXAMPLES 1 TO 4

The casting resins, the properties of which are tabulated in Tables 1 to 4, were all prepared in the same manner. In each case a mixture of 32 g of a highly reactive methacrylate resin (Plexit ® MV 51, a commercial product of Roehm Gmbh, Darmstadt) and 16 g of methylmethacrylate was placed in a measuring vessel and the amounts of unsaturated organosilane and metallic acid ester given in Tables 1 to 4 were mixed with it. Then, using a whisk stirrer at 700 to 800 rpm, a total of 72 g of a fine quartz flour (grain size range 0 to 40 microns) was dispersed in the mixture over a period of 8 to 10 minutes.

The viscosity of the substances thus obtained is given in Tables 1 to 4. The viscosity is lower in the compositions of the invention than in those containing either the unsaturated organosilane alone or the metallic acid ester alone. The Tables furthermore show that even with a small amount of the second component of the mixture an unexpected improved result is obtained. The optimum action occurs at different ratios of admixture, depending on which metallic acid ester is used.

The viscosity determination was performed in these and the following Examples by means of a Brookfield RV viscosimeter. The individual resin specimens were adjusted to 20° C. and tested after the stated storage periods. The measurements were performed with spindle 5 at 10 and 50 rpm.

TABLE 1

Viscosity of mixtures of quartz flour and methacrylate resin in relation to the ratio of gamma-methacryloxypropyl-trimethoxysilane to zirconium butylate.

| Mixture of gamma-methacryloxytrimethoxysilane (I) and zirconium butylate (II) | | Viscosity [mPa · s] | | | |
|---|---|---|---|---|---|
| | | 10 rpm | | 50 rpm | |
| I [%] | II [%] | 1 h | 24 h | 1 h | 24 h |
| — | — | 15000 | 13900 | 6200 | 6000 |
| 0.5 | — | 16400 | 13300 | 6700 | 5700 |
| 0.45 | 0.05 | 10800 | 6700 | 5400 | 3900 |
| 0.40 | 0.10 | 8400 | 5600 | 5000 | 3800 |
| 0.35 | 0.15 | 6400 | 4600 | 3900 | 3100 |
| 0.3 | 0.2 | 5800 | 4300 | 4000 | 3200 |
| 0.25 | 0.25 | 5700 | 4000 | 3900 | 3100 |
| 0.20 | 0.30 | 4500 | 3800 | 3500 | 2900 |
| 0.15 | 0.35 | 4300 | 4000 | 4400 | 3000 |
| 0.10 | 0.40 | 4300 | 4000 | 3500 | 3200 |
| 0.05 | 0.45 | 4800 | 4000 | 3800 | 3200 |
| — | 0.5 | 5600 | 4600 | 4200 | 3500 |
| — | 0.3 | 6800 | 5600 | 5200 | 4400 |
| — | 0.2 | 11600 | 8800 | 6200 | 5100 |
| — | 0.1 | 13600 | 11800 | 7000 | 6000 |

TABLE 2

Viscosity of mixtures of quartz flour and methacrylate resin in relation to the ratio of gamma-methacryloxypropyltrimethoxysilane and tetrabutyltitanate.

| Mixture of gamma-methacryloxypropyltrimethoxysilane (I) and tetrabutyltitanate (II) | | Viscosity [mPa · s] | | | |
|---|---|---|---|---|---|
| I [%] | II [%] | 1 h | 24 h | 1 h | 24 h |
| 0.5 | — | 12000 | 11300 | 5200 | 4900 |
| 0.4 | 0.1 | 7200 | 5300 | 4000 | 3200 |
| 0.3 | 0.2 | 6600 | 5100 | 3800 | 2900 |
| 0.2 | 0.3 | 6000 | 5200 | 3800 | 3100 |
| — | 0.5 | 8000 | 8000 | 4100 | 4000 |
| — | — | 11600 | 11200 | 5200 | 4900 |

TABLE 3

Viscosity of mixtures of quartz flour and methacrylate resin in relation to the ratio of vinyltrimethoxysilane to zirconium butylate.

| Mixture of vinyltrimethoxysilane (I) and zirconium butylate (II) | | Viscosity [mPa · s] | | | |
|---|---|---|---|---|---|
| | | 10 rpm | | 50 rpm | |
| I [%] | II [%] | 1 h | 24 h | 1 h | 24 h |
| 0.5 | — | 10200 | 11800 | 4700 | 5300 |
| 0.4 | 0.1 | 9400 | 8000 | 4200 | 4700 |
| 0.3 | 0.2 | 10200 | 8000 | 5000 | 4200 |
| 0.2 | 0.3 | 9800 | 7800 | 4600 | 4100 |
| — | — | 11600 | 11100 | 5200 | 4900 |

TABLE 4

Viscosity of mixtures of quartz flour and methacrylate resin in relation to the ratio of vinyltrimethoxysilane to tetrabutyltitanate.

| Mixture of vinyltrimethoxysilane (I) and tetrabutyltitanate (II) | | Viscosity [mPa · s] | | | |
|---|---|---|---|---|---|
| | | 10 rpm | | 50 rpm | |
| I [%] | II [%] | 1 h | 24 h | 1 h | 24 h |
| 0.5 | — | 10200 | 11800 | 4700 | 5300 |
| 0.4 | 0.1 | 8400 | 3600 | 4500 | 2800 |
| 0.3 | 0.2 | 6000 | 4200 | 3700 | 3000 |
| 0.2 | 0.3 | 6400 | 5400 | 3700 | 3200 |
| — | — | 11600 | 11100 | 5200 | 4900 |

EXAMPLE 5

The procedure of Examples 1 to 4 were repeated, except that instead of the highly reactive methacrylate resin a medium reactive methacrylate resin was used, which is commercially obtainable under the same Plexit M 60 (product sold by Roehm GmbH, Darmstadt).

The tests were performed with varying amounts of gamma-methacryloxypropyltrimethoxysilane (MEMO) and zirconium butylate [Zr(Obut)$_4$]. The results of the measurements are given in Table 5; they show that, even in the case of a less reactive acrylate resin, the above-described unexpected improved result is produced, and that the optimum ratio of admixture of the additives of the invention depends on the types of resin used.

TABLE 5

Viscosity of mixtures of quartz flour and methacrylate resin in relation to the ratio of gamma-methacryloxypropyltrimethoxysilane to zirconium butylate.

| MEMO [%] | Zr(Obut) [%] | Viscosity [mPa · s] | | | |
|---|---|---|---|---|---|
| | | 10 rpm | | 50 rpm | |
| | | 1 h | 24 h | 1 h | 24 h |
| — | — | 11400 | 11500 | 4900 | 4900 |
| 0.5 | — | 10500 | 10400 | 4400 | 4500 |
| 0.45 | 0.05 | 9000 | 8600 | 4100 | 4200 |
| 0.40 | 0.1 | 7800 | 7200 | 3800 | 3700 |
| 0.35 | 0.15 | 4200 | 5800 | 3200 | 3200 |
| 0.3 | 0.2 | 6000 | 5500 | 3200 | 3200 |
| 0.25 | 0.25 | 7200 | 6400 | 3900 | 3500 |
| 0.20 | 0.30 | 9300 | 6700 | 3800 | 3600 |
| 0.15 | 0.35 | 9400 | 7900 | 4100 | 3900 |
| 0.10 | 0.40 | 9800 | 8300 | 4600 | 4100 |
| 0.05 | 0.45 | 11400 | 9000 | 5000 | 4200 |
| — | 0.5 | 10800 | 10800 | 4900 | 4900 |
| — | 0.3 | 10500 | 9900 | 4800 | 4600 |
| — | 0.2 | 10600 | 11300 | 5100 | 5000 |
| — | 0.1 | 12300 | 11400 | 5300 | 4900 |

EXAMPLE 6

A number of casting compositions were prepared in the same manner, using an unsaturated polymeric organosilane as follows:

In each case, a mixture of 105 g of a highly reactive methacrylate resin (Plexit, MV 51 of Roehm GmbH, Darmstadt) and 35 g of methylmethacrylate was placed in a measuring vessel, and the amounts of unsaturated polymeric organosilane given in Table 6, added in some cases to a mixture of 1 mol of titanium butylate and 4 mol of acetic acid ester, identified in Table 6 as MEMIG, were added thereto. Then, using a whisk stirrer running at 2000 rpm, first 210 g of a fine quartz flour (particle size spectrum 0 to 40 microns) was added over a period of about 10 minutes, and then 1.4 g of ultramarine blue pigment (a commercial product of Reckitt's Colours S.A., Comines, France) was dispersed in the mixture.

The viscosity of the compositions thus obtained is given in Table 6. The viscosity of the compositions of the invention is lower than those containing either the polymeric organosilane alone or the metallic acid ester alone even when the unsaturated polymeric organosilanes used have a viscosity-reducing action without the addition of a metallic acid ester.

The determination of the viscosity was performed with a Brookfield RV viscosimeter. The individual specimens were brought to a temperature of 20° C. and tested after the specified storage time. The measurements were performed with spindle 5 at 10 and 50 rpm.

TABLE 6

Viscosity of pigmented mixtures of quartz flour and methacrylate resin.

| Sample No. | UP01 wt-% | UPO 2 wt-% | MEMIG wt-% | Viscosity [mPa · s] | | | |
|---|---|---|---|---|---|---|---|
| | | | | 10 rpm | | 50 rpm | |
| | | | | 2 h | 24 h | 2 h | 24 h |
| (a) | — | — | — | 11200 | 11200 | 5900 | 6000 |
| (b) | 0.5 | — | — | 11200 | 6000 | 6800 | 4600 |
| (c) | 0.4 | — | 0.1 | 4200 | 3600 | 3800 | 3700 |
| (d) | — | 0.5 | — | 5200 | 3800 | 4000 | 3600 |

TABLE 6-continued

Viscosity of pigmented mixtures of quartz flour and methacrylate resin.

| Sample No. | UPO1 wt-% | UPO 2 wt-% | MEMIG wt-% | Viscosity [mPa · s] | | | |
|---|---|---|---|---|---|---|---|
| | | | | 10 rpm | | 50 rpm | |
| | | | | 2 h | 24 h | 2 h | 24 h |
| (e) | — | 0.4 | 0.1 | 3000 | 2800 | 3200 | 3200 |

Key to Table 6:
UPO 1 = unsaturated polymeric organosilane = reaction product of sodium acrylate and a polymer prepared from
90 wt-parts of vinyl acetate
5 wt-parts of vinyl chloroacetate and
5 wt-parts of vinyltrimethoxysilane,
used in the form of a solution of about 43% in toluene.
UPO 2 = unsaturated polymeric organosilane = reaction product of sodium acrylate and a polymer which was prepared from
85 wt-parts of vinyl acetate
5 wt-parts of vinyl chloroacetate and
10 wt-parts of vinyltrimethoxysilane,
used in the form of a solution of about 43% in toluene.

EXAMPLE 7

140 grams of the highly reactive methacrylate resin named in Example 1, diluted in a ratio of 3:1 with methylmethacrylate, were placed in a reaction vessel, and then 1.68 g of gamma-methacryloxypropyltrimethoxysilane and 0.42 g of zirconium isobutylate were mixed in and 210 g of fine quartz flour (particle size spectrum 0 to 40 microns) was dispersed in the mixture. The mixture was then stirred for 10 minutes at 2000 rpm.

After a deaeration period of about 16 hours, 0.7 g of a peroxide catalyst specific for the acrylic resin and 0.7 g of an activator were stirred in, and plates measuring 200×200×4 mm were cast from the mixture. The set plates set within 20 minutes. The set plates were then cured for another 14 hours at 80° C.

For the determination of the impact and bending strengths listed in Table 7, standard specimens measuring 50×6×4 mm were sawed from the plates.

The physical values obtained are given in Table 7.

TABLE 7

| | Bending strength in N/mm² per DIN 53 452 | | Impact strength in kJ/m² per DIN 53 453 | |
|---|---|---|---|---|
| | direct | after 6 h of boiling | direct | after 6 h of boiling |
| Blank test | 56 | 47 | 1.9 | 1.8 |
| Example 6 | 92 | 111 | 2.8 | 4.2 |
| Example for comparison | 71 | 99 | 2.9 | 3.8 |

In the example for comparison, plates were used which were made in the same manner, but which contained, instead of the mixture of methacrylosilane and zirconium isobutylate, the same amount of gamma-methacryloxypropyltrimethoxysilane.

EXAMPLE 8

After a deaeration period of about 16 hours, 0.7 g of a peroxide catalyst specific for the acrylic resin and 0.7 g of an activator were stirred into the samples of Example 7, and plates measuring 200×200×4 mm were cast from the mixture. The plates set within 20 minutes. They were then cured for another 14 hours at 80° C.

To determine the bending strength and impact strength, standard specimens measuring 50×6×4 mm were sawed from the plates. The physical characteristics of these specimens are given in Table 8.

TABLE 8

| Sample No. * | Bending strength in N/mm² per DIN 53 452 | | Impact strength in kJ/m² per DIN 53 453 | |
|---|---|---|---|---|
| | direct | after 6 h of boiling | direct | after 6 h of boiling |
| (a) Blank test | 67 | 54 | 2.0 | 1.6 |
| (b) Example for comparison | 69 | 9 | 2.0 | 2.8 |
| (c) Invention | 100 | 103 | 4.4 | 4.4 |
| (d) Example for comparison | 68 | 87 | 2.1 | 2.9 |
| (e) Invention | 111 | 102 | 4.0 | 3.9 |

*See Table 7

EXAMPLES 9 TO 15

Additional tests were conducted in accordance with the procedure specified under Examples 1 to 4 except that in the additional tests 45 grams of the methacrylate resin Plexit MV 51 and 15 grams of the methyl methacrylate each were used. The results of these tests are respectively shown in Tables 9 through 15. Each Table respectively names the organosilicon compound and metallic acid ester used for each test and shows the amounts of the respective materials added and the resulting viscosities of the product.

TABLE 9

(I): 3-methacryloxypropyltri[2-(2-methoxy-ethoxy)-ethoxy]
(II): Zirconium complex

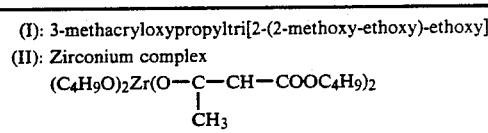

| Mixture of (I) and (II) parts per weight based on the amount of filler | | Viscosity [mPa · s] | |
|---|---|---|---|
| (I) [%] | (II) [%] | 10 rpm 24 h | 50 rpm 24 h |
| — | — | 14 300. | 7 200. |
| 0,5 | — | 6 840 | 5 360 |
| 0,4 | 0,1 | 3 800 | 3 460 |
| 0,25 | 0,25 | 3 720 | 3 680 |
| 0,12 | 0,33 | 4 060 | 3 920 |
| — | 0,5 | 4 720 | 4 560 |

TABLE 10

(I): 3-methacryloxypropyltrimethoxysilane
(II): Zirconium complex

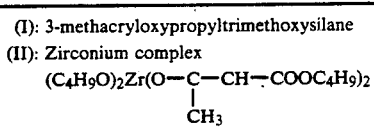

| Mixture of (I) and (II) parts per weight based on the amount of filler | | Viscosity [mPa · s] 10 rpm |
|---|---|---|
| (I) [%] | (II) [%] | 24 h |
| 1,0 | — | 9 000 |
| 0,8 | 0,2 | 3 600 |
| 0,6 | 0,4 | 3 800 |
| — | 1,0 | 4 200 |

TABLE 11

(I): 3-methacryloxypropyltrimethoxysilane
(II): Titanium-acetylacetonate

| Mixture of (I) and (II) parts per weight based on the amount of filler | | Viscosity [mPa · s] | |
|---|---|---|---|
| | | 10 rpm | 50 rpm |
| (I) [%] | (II) [%] | 24 h | 24 h |
| — | — | 14 300 | 7 200 |
| 0,5 | — | 11 500 | 6 340 |
| 0,4 | 0,1 | 3 500 | 3 400 |
| 0,25 | 0,25 | 3 700 | 3 620 |
| — | 0,5 | 5 300 | 4 680 |

TABLE 12

(I): 3-methacryloxypropyltrimethoxysilane
(II): Zirconium complex $$(C_4H_9O)(CH_3O-C_2H_4-O)_2Zr(O-\underset{CH_3}{\underset{|}{C}}=CH-COCH_3)$$

| Mixture of (I) and (II) parts per weight based on the amount of filler | | Viscosity [mPa · s] | |
|---|---|---|---|
| | | 10 rpm | 50 rpm |
| (I) [%] | (II) [%] | 24 h | 24 h |
| — | — | 14 300 | 7 200 |
| 0,5 | — | 11 500 | 6 340 |
| 0,375 | 0,125 | 4 600 | 3 780 |
| 0,25 | 0,25 | 4 400 | 3 700 |
| — | 0,5 | 5 500 | 4 900 |

TABLE 13

(I): Vinyltrimethoxysilane
(II): Isopropyltriisostearoyltitanate

| Mixture of (I) and (II) parts per weight based on the amount of filler | | Viscosity [mPa · s] | |
|---|---|---|---|
| | | 10 rpm | 50 rpm |
| (I) [%] | (II) [%] | 24 h | 24 h |
| 0,5 | — | 9 100 | 5 650 |
| 0,4 | 0,1 | 4 200 | 3 920 |
| 0,25 | 0,25 | 4 600 | 4 320 |
| — | 0,5 | 5 300 | 4 680 |

TABLE 14

(I): Vinyltrimethoxysilane
(II): Titanate complex $$(CH_3O-C_2H_4-O-C_2H_4O)_2Ti(O-\underset{CH_3}{\underset{|}{C}}-CH-COCH_3)_2$$

| Mixture of (I) and (II) parts per weight based on the amount of filler | | Viscosity [mPa · s] | |
|---|---|---|---|
| | | 10 rpm | 50 rpm |
| (I) [%] | (II) [%] | 24 h | 24 h |
| 0,5 | — | 9 100 | 5 650 |
| 0,4 | 0,1 | 4 200 | 3 920 |
| 0,25 | 0,25 | 4 600 | 4 320 |
| — | 0,5 | 5 300 | 4 680 |

TABLE 15

(I): Vinyltrimethoxysilane
(II): Titanate complex $$(C_4H_9O)_2Ti(O-\underset{O}{\underset{\|}{C}}-n-C_{11}H_{23})_2$$

| Mixture of (I) and (II) parts per weight based on the amount of filler | | Viscosity [mPa · s] | |
|---|---|---|---|
| | | 10 rpm | 50 rpm |
| (I) [%] | (II) [%] | 24 h | 24 h |
| 0,5 | — | 9 100 | 5 650 |
| 0,4 | 0,1 | 5 360 | 4 520 |
| 0,25 | 0,25 | 6 400 | 5 020 |
| — | 0,50 | 12 600 | 6 640 |

EXAMPLE 16

A modified methacrylate resin, obtained from 164 g of methyl methacrylate, 5 g of trimethylolpropane trimethacrylate and 10 g of poly(methyl methacrylate) was mixed with an additive consisting of 0.75 g of 3-methacryloxypropyltrimethoxysilane (DYNASYLAN MEMO of the Firma Hüls Troisdorf AG) and 0.25 g of isopropyl triisostearoyl titanate. The fillers were subsequently added in two separate steps.

The following were used as fillers:

| | | |
|---|---|---|
| quartz powder | <0.1 mm | 550 g |
| quartz gravel | 0.1–0.7 mm | 605 g |
| quartz gravel | 0.7–1.4 mm | 465 g |
| quartz gravel | 2.0–3.0 mm | 690 g |
| quartz gravel | 3.0–4.0 mm | 440 g |
| | | 2,750 g |

In the first step, the quartz powder was stirred into the resin by means of a basket stirrer. A homogeneous slurry was formed, the viscosity of which was measured with a Brookfield RV viscosimeter (20°, spindle 6) at different rotational speeds (Table 16A).

TABLE 16A

| | [in Pa × sec] | | |
|---|---|---|---|
| | 10 r.p.m | 20 r.p.m | 50 r.p.m |
| without additive | 27,000 | 22,000 | 17,000 |
| with additive | 12,000 | 10,000 | 7,000 |

As polymerization catalysts, first 5.0 g of benzoyl peroxide (100%) and then 2.5 g of dimethyl-p-toluidine (100%) were introduced as starter and activator respectively into the slurry and distributed uniformly.

After the slurry was transferred to a Hobart kneader mixer, the coarse quartz gravel was added in a second step. The casting resin mixture, produced by this method, was kneaded for about 1 minute and subsequently cast into 40×160 mm prisms. The prisms were sawn into 19.5×19.5×160 mm test pieces and the mechanical strength values of these were determined by a method based on DIN 1164 (Table 16B).

TABLE 16B

| | Bending Strength (N/mm$^2$) | Compression Strength (N/mm$^2$) |
|---|---|---|
| without additive | 23 | 86 |
| with additive | 36 | 135 |

EXAMPLE 17

A methacrylate resin, prepared as in Example 16, was mixed with an additive consisting of 0.75 g of 3-methacryloxypropyltrimethoxysilane (DYNASYLAN MEMO) and 0.25 g of a mixture of 1 mole of zirconium butylate and 4 moles of ethyl acetoacetate. The method of preparing the test pieces, as well as the measurement method correspond to those of Example 16. Only the particle size distribution of the coarse additive differed from that in Example 16,

|  |  |  |
|---|---|---|
| quartz powder | <0.1 mm | 550 g |
| quartz gravel | 0.1-0.7 mm | 605 g |
| quartz gravel | 0.7-1.4 mm | 465 g |
| quartz gravel | 2.0-3.0 mm | 690 g |
| quartz gravel | 3.0-4.0 mm | 440 g |
|  |  | 2,750 g |

The following viscosities were found (Table 17A):

TABLE 17A

|  | [in Pa × sec] | | |
|---|---|---|---|
|  | 10 r.p.m. | 20 r.p.m | 50 r.p.m |
| without additive | 27,000 | 22,000 | 17,000 |
|  | 15,000 | 11,000 | 9,000 |

The following mechanical strength values were found (Table 17B):

TABLE 17B

|  | Bending Strength (N/mm$^2$) | Compression Strength (N/mm$^2$) |
|---|---|---|
| without additive | 23 | 86 |
| with additive | 34 | 120 |

It will be understood that the specification and examples are illustrative but not limitative of the present invention and that other embodiments within the spirit and scope of the invention will suggest themselves to those skilled in the art.

I claim:

1. A casting resin comprising fluid, hardenable acrylic and methacrylic acid esters and finely divided inorganic fillers, the resin further comprising an organosilicon compound having one or more ethylenically unsaturated groups; and a metallic acid ester of metals of the Fourth or Fifth Subgroup of the Periodic System of the Elements.

2. The casting resin of claim 1 wherein the organosilicon compound includes gamma-methacryloxypropyl-trialkoxysilanes.

3. The casting resin of claim 1 wherein the organosilicon compound includes vinyltrialkoxysilanes.

4. The casting resin of claim 1 wherein the organosilicon compound has a plurality of ethylenically unsaturated groups and is a reaction product of salts of (meth)acrylic acid with copolymers of
   a) vinyl chloroacetate and
   b) alkoxysilyl compounds with a vinyl or methacryloxypropyl moiety.

5. The casing resin of claim 1 wherein the metallic acid ester is at least one compound selected from the group consisting of an ester of titanic acid, an ester of vanadic acid and an ester of zirconic acid.

6. The casting resin of claim 1 containing the organosilicon compound in amounts of 0.025 to 4% by weight with respect to the content of the filler.

7. The casting resin of claim 1 containing the metallic acid ester in amounts of 0.009 to 1% by weight with respect to the content of the filler.

8. The casting resin of claim 5 containing the organosilicon compound in amounts of 0.025 to 4% by weight with respect to the content of the filler.

9. The casting resin of claim 1 wherein the organosilicon compound is at least one having a formula

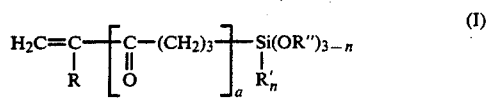
$$H_2C=C{\underset{R}{|}}{\left[{\underset{O}{\overset{\|}{C}}}-(CH_2)_3\right]}_a-{\underset{R'_n}{\overset{|}{Si}}}(OR'')_{3-n} \quad (I)$$

where R is hydrogen if a =0 or 1 or —CH$_3$ if a=1; R' is methyl or vinyl when a=0 or an alkyl with 1 to 4 carbon atoms when a=1 and R'' is alkyl of 1 to 4 chain carbon atoms; a=0 or 1 and n =0 or 1 or 2;

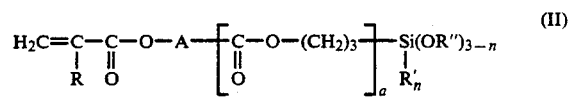
$$H_2C=C{\underset{R}{|}}-{\underset{O}{\overset{\|}{C}}}-O-A{\left[{\underset{O}{\overset{\|}{C}}}-O-(CH_2)_3\right]}_a-{\underset{R'_n}{\overset{|}{Si}}}(OR'')_{3-n} \quad (II)$$

where R is hydrogen or CH$_3$, R' and R'' is alkyl of 1 to 4 chain carbon atoms, a=0 or 1 and n=0 or 1 or 2.

10. The casting resin of claim 1 wherein the organosilicon compound is selected from the group consisting of vinyl trimethoxysilane, vinyltriethoxysilane, vinyltris-(methoxyethoxy)-silane, divinyldimethoxysilane, vinylmethyldimethoxysilane, gamma-methacryloxypropyltrimethoxysilane and gamma-methacryloxypropyltris(methoxyethoxy)-silane.

11. The casting resin of claim 1 wherein the filler content is from 20 to 95 wt.-% with the proviso that when the filler content is in excess of 80 wt.-%, the filler contains 10 to 30 wt.-%, based on the total weight of filler, of fines having a particle size less than 0.1 mm and the remainder of the filler being coarse up to 4 mm.

12. The casting resin of claim 1 wherein the ethylenically unsaturated group of the organosilicon compound is joined to an alkoxysilyl group either directly or through a

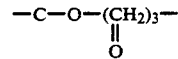
$$-\underset{O}{\overset{\|}{C}}-O-(CH_2)_3-$$

group with the silicon atom.

13. The casing resin of claim 5 containing the organosilicon compound in amounts of 0.4 to 1.2% by weight with respect to the content of the filler.

14. The casting resin of claim 1 containing the organosilicon compound in amounts of 0.4 to 1.2%, by weight, with respect to the content of the filler.

15. The casting resin of claim 1 containing the metallic acid ester in amounts of 0.1 to 0.6%, by weight, the with respect to the content of the filler.

16. A hardenable composition flowable at its pouring temperature without addition of a polymeric dispersant comprising fluid, hardenable acrylic and methacrylic acid esters, said esters having a viscosity of not more than 50 poise at pouring temperature, and 20 to 80 wt.-% finely divided inorganic fillers, the composition further comprising 0.2 to 4 wt.-%, based on the amount of filler, of an organosilicon compound having an ethylenically unsaturated group; and a metallic acid ester selected from the group consisting of an ester of titanic acid and ester of zirconium acid present in a weight ratio range of 1:10 to 10:2 to the organosilicon component to lower the viscosity of the flowable composition.

17. The casting resin of claim 4 wherein the copolymers contain additionally nonfunctional building blocks derived from ethylenically unsaturated groupings, which nonfunctional building blocks are incorporated by polymerization.

* * * * *

UNITED STATES PATENT AND TRADEMARK OFFICE
CERTIFICATE OF CORRECTION

PATENT NO. : 5,079,286
DATED : January 7, 1992
INVENTOR(S) : Horst Hanisch et al It is certified that error appears in the above-identified patent and that said Letters Patent is hereby corrected as shown below:

Col. 3, line 1, "$R^{11}$" should read --R"--.

Col. 3, line 45, "-A"-" should read -- -A'- --.

Col. 3, line 55, "n = 0 or 1 or 1" should read
 --n = 0 or 1 or 2--.

Col. 3, line 56, delete "V" at end of line.

Col. 4, line 65, before "however" insert --contents, i.e.,
 above 80%, a portion of the fillers,--.

Signed and Sealed this

Third Day of August, 1993

Attest:

MICHAEL K. KIRK

*Attesting Officer*  *Acting Commissioner of Patents and Trademarks*